United States Patent [19] | [11] Patent Number: 4,830,909
Cohen et al. | [45] Date of Patent: May 16, 1989

[54] SCRATCH RESISTANT RECORDING MATERIALS FOR ELECTROEROSION PRINTING COMPRISING CROSS-LINKED POLYMER BASE LAYER

[75] Inventors: Mitchell S. Cohen, Ossining; Krishna G. Sachdev, Wappingers Falls, both of N.Y.; John C. S. Shen, Rochester, Minn.; Keith S. Pennington, Somers, N.Y.

[73] Assignee: International Business Machines Corporation, Armonk, N.Y.

[21] Appl. No.: 16,981

[22] Filed: Feb. 18, 1987

Related U.S. Application Data

[63] Continuation of Ser. No. 850,474, Apr. 10, 1986, abandoned, which is a continuation of Ser. No. 692,009, Jan. 15, 1985, abandoned.

[51] Int. Cl.⁴ ........................ G01D 15/34; B05D 5/12
[52] U.S. Cl. ................................ 428/331; 346/135.1; 346/162; 346/163; 427/121; 428/423.1; 428/423.7
[58] Field of Search .................. 428/331, 423.7, 423.1, 428/209; 346/135.1, 162, 163; 427/121

[56] References Cited

U.S. PATENT DOCUMENTS

| | | | |
|---|---|---|---|
| 3,514,325 | 5/1970 | Davis et al. | 346/135.1 |
| 3,786,518 | 1/1974 | Athorton | 346/135.1 |
| 3,861,952 | 1/1975 | Tokumoto et al. | 428/207 |
| 4,217,596 | 8/1980 | Jung | 346/135.1 |
| 4,305,082 | 12/1981 | Kusakawa et al. | 346/135.1 |
| 4,339,758 | 7/1982 | Bhatia et al. | 346/135.1 |
| 4,384,012 | 5/1983 | Huisman et al. | 427/130 |
| 4,400,706 | 8/1983 | Takemura et al. | 346/135.1 |
| 4,567,490 | 1/1986 | Afzali-Ardakani | 428/323 |
| 4,596,733 | 6/1986 | Cohen et al. | 346/163 |
| 4,617,579 | 10/1986 | Sachder et al. | 346/163 |

*Primary Examiner*—Paul J. Thibodeau
*Attorney, Agent, or Firm*—Jackson E. Stanland

[57] ABSTRACT

Electroerosion recording materials of superior scratch resistance are provided by incorporating a hard, cross-linked polymer film or layer between the support and the removable, thin conductive layer to reduce plastic deformation of the support under stylus writing pressure. The intermediate polymer layer may be unfilled or filled with solid particles, such as silica particles. The materials may be used in various printing processes including making directly readable images, direct negatives, and offset masters.

10 Claims, 1 Drawing Sheet

DIRECT NEGATIVE

OFFSET MASTER

SCRATCH RESISTANT RECORDING MATERIALS FOR ELECTROEROSION PRINTING COMPRISING CROSS-LINKED POLYMER BASE LAYER

RELATED APPLICATIONS

This is a continuation of Ser. No. 850,474 filed Apr. 10, 1986, now abandoned, which in turn is a continuation of Ser. No. 692,009 filed Jan. 15, 1985, now abandoned.

TECHNICAL FIELD

The invention relates to electroerosion printing and to recording materials for use as human readable material and for use in the production of offset masters.

Electroerosion printing is a well-known technique for producing markings, such as letters, numbers, symbols, patterns such as circuit patterns, or other legible or coded indicia on recording material in response to an electric signal which removes or erodes material from the surface of the recording material as the result of spark initiation (arcing).

The surface which is eroded or removed to provide such indicia on the recording material is usually a thin film of conductive material which is vaporized in response to localized heating associated with sparking (arcing) initiated by applying an electric current to an electrode in contact with the surface of a recording material comprising the thin conductive film on a non-conductive backing or support. In the present state of the technology, the thin conductive film is usually a thin film of vaporizable metal, such as aluminum. Electroerosion materials and processes are useful to produce directly human readable images, photomasks, etc. For a number of such applications there is needed a flexible substrate and a hard surfaced metal film. Substrates of paper and plastic have been employed with thicknesses on the order of 2 to 5 mils and as the hard metal films, vapor deposited aluminum films of a thickness on the order of 0.5 to 5 microinches have been utilized. For details on materials heretofore used in electroerosion printing, see U.S. Pat. No. 4,082,902, Suzuki, and U.S. Pat. No. 4,086,853, Figov.

Electroerosion printing is effected by the movement of a stylus or a plurality of styli in relation to the surface of specially prepared recording media. Electrical writing signals are fed to the stylus to provide controlled electrical pulses which generate arcing at the surface of the recording material selectively to heat and remove by evaporation a layer of the recording material; the removed material corresponds to the indicia which are to be recorded.

In the course of this process the stylus is moved in relationship to a surface of the recording material and in contact with the removable layer, e.g., a thin film of vaporizable material, usually metal such as aluminum.

Due to the fragility of the thin conductive layer and the pressure of the stylus on that layer, severe mechanical scratching has been observed. It is believed that the scratching is attributable to several causes, including plastic deformation of the substrate during writing. The thin conductive film, for example the vapor-deposited thin aluminum film, apparently cannot withstand the high strains generated when the support or substrate is deformed and therefore ruptures resulting in scratching. Also, there are occasions when the styli cold-weld to the thin aluminum conductive layer so that the structure suffers shear either at the aluminum-substrate interface or below it in the substrate itself.

PRIOR ART

Various measures have been proposed to combat the problem of scratching. For example, it has been suggested to suppress the plastic deformation of the substrate by creating a thin hard layer below the aluminum. The hardness of the layer would be selected to prevent the undesired deformation, but the thickness of the layer would be such that the gross flexibility of the sheet necessary for electroerosion writing and handling would be maintained. The method of obtaining this hard layer involves the incorporation of a layer of small hard particles in a suitable polymeric binder, for example silica particles in a cellulose-acetate-butyrate polymer binder.

This system was found in fact to decrease scratching caused by the polymer-substrate deformation mechanism. Although such a base layer provides substantial improvement in scratch resistance, some scratching still remains, caused by the fact that the hard particles in these coatings are easily abraded during the printing process due to high local pressure caused by the styli on such rough surfaces which may not provide the necessary abrasion resistance.

We know of no prior art teachings directly pertinent to our invention. Various references broadly disclose crosslinked polymers but none discloses the use of such materials in the environment of our invention or with the beneficial results in terms of improving the qualities of electroerosion recording materials.

IBM Technical Disclosure Bulletin Vol. 13, No. 10, p. 2948, March 1971, by R. M. Ross et al entitled "Deformographic Material" dislcoses a polymer system with a curing temperature in the range of 150°-200° C. This would not be practical for use in connection with some of the subsrates which are preferred in electroerosion recording materials. For example, one of the preferred substrate materials may be a polyester, such as Mylar, which deforms at temperatures above 120° C.

U.S. Pat. No. 3,514,325, Davis et al, discloses an electroerosion recording material in which a surface layer of crosslinked binder containing conductive particles such as zinc oxide is placed on top of the thin aluminum layer.

U.S. Pat. No. 3,740,254, Lansbury et al, describes an isocyanate-ended polyurethane composition, i.e., a prepolymer, as a primer for the deposition of thin aluminum films on various substrates including plastic substrates. The purpose here is to improve adhesion of the aluminum film.

U.S. Pat. No. 3,786,518, Atherton, describes an electroerosion recording material comprising, for example, a thin conductive film of aluminum deposited over a resin which has been provided with a matte finish by the inclusion of a matting agent or by treating the resin surface. A wide variety of resinous materials is suggested for the resin layer.

U.S. Pat. No. 4,268,570, Imanaka et al, describes the optional use of a polyurethane adhesive layer between the polymer support and the aluminum layer in plastic molded products, such as resin plates, tubes, and the like. The structures are unrelated to electroerosion printing.

U.S. Pat. No. 4,217,596, Jung, describes an electroerosion recording paper comprising a layer of lacquer or printing ink or both between the thin conductive aluminum layer and a paper support.

U.S. Pat. No. 4,305,082, Kusakawa et al, describes an electroerosion recording paper in which a resistance layer may be provided over the thin conductive aluminum film.

U.S. Pat. No. 4,304,806, Anderson et al, describes information-carrying discs coated wtih an abrasion-resistant polymer layer derived from an epoxy-terminated silane.

U.S. Pat. No. 4,339,758 of Bhatia et al, describes an electrosensitive recording that uses a silicon dioxide containing resinous base layer between the support and the overlying metallic film.

SUMMARY OF THE INVENTION

In accordance with the present invention, it has been found that electroerosion recording materials having superior resistance to surface abrasion or scratching of the thin conductive film, such as aluminum, can be produced by providing between the conductive film and the support a thin hard layer of crosslinked polymer having sufficient hardness to substantially eliminate scratching due to plastic deformation of the support without reducing the handling and writing qualities of the recording material. This layer may be unfilled or filled with a small amount of hard particulate materials, such as silica, which is more tightly held in the crosslinked polymer matrix than in the previous uncrosslinked binder, and therefore is more resistant to undesired abrasion during scanning by the stylii.

A direct negative may be produced by electroerosion printing using the materials according to the present invention. The direct negative is used in the same manner as a photonegative in a reproduction process. Where such direct negative is to be produced, the hard particulate material must be light transmissive. Silica particles of about 1 to 3 microns are suitable for such hard particulate material.

Where a direct master is to be produced the hard particulate material must be light transmissive. Silica particles of about 1 to 3 micron are suitable for such purpose.

DETAILED DESCRIPTION OF THE INVENTION

Figure 1:
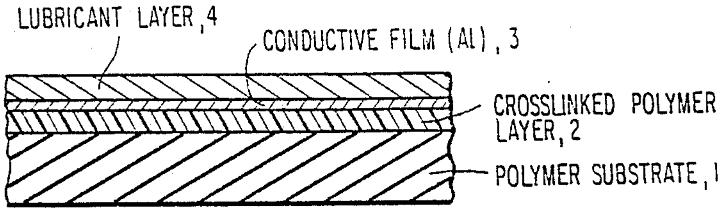
FIG. 1 of the drawing is a cross-sectional view of an electroerosion material in accordance with this invention.

The present invention is concerned with improvements in electroerosion recording materials and in particular such materials which are useful in the production of offset masters.

In the broadest sense the invention comprises the provision between the thin conductive film and the plastic support member, such as a polyester, e.g., Mylar, of a hard polymeric film or layer of high tensile strength and high softening temperature which reduces plastic deformation of the support member during electroerosion writing sufficiently so that abrasion of the thin conductive film, usually evaporated aluminum, is minimized. The hardness, thickness and asperities caused by inorganic fillers such as silica, of this intermediate layer, are also selected so that the handling and writing characteristics of the recording material are not adversely affected.

According to this invention, a superior hard thin underlayer can be provided for electroerosion recording materials by selection of a crosslinked polymeric material which is sufficiently hard by itself to reduce the scratching due to plastic deformation of the substrate. An advantage of the crosslinked binder is that a relatively low concentration of hard particles can be used but the layer is still extremely hard; in fact, if desired the particles could be omitted entirely and the layer is still hard enough to inhibit scratching. However, when the particles are included, for example in order to scour off debris from the recording styli, the crosslinking fixes them firmly in place, thus reducing the chance that the particles will be picked up and adhere to the styli and hence cause scratching. This is true because we now have hard particles in a hard matrix; if the correct crosslinker is chosen the layer can be tough as well as hard. A further advantage of crosslinking the underlayer is that, if the crosslinker is properly chosen, there will be less tendency to create, during writing, a soft adherent residue which could cake onto the styli and inhibit further writing.

The highly crosslinked hydrophobic polymer coatings of this invention have the desired hardness and tensile strength, high softening temperature, improved moisture barrier properties, decreased flexibility and elongation, and decreased solubility in commonly employed solvents.

Fabrication of composite structures for electroerosion printing applications described in this invention utilizes such crosslinked polymer matrices as base layers which, unlike uncrosslinked systems, do not yield to this high local temperature and pressure produced during printing and thus minimize the scratching problem, and reduce or eliminate generation of soft debris which would adhere to the print head and thus interfere with the printing process. Also, due to the superior passivating properties of these crosslinked hydrophobic polymer coatings, their application according to this invention provides a built-in mechanism for corrosion resistance of thin conductive films such as A1 with consequent improvement in shelf life and performance reliability of composites designed for elctroerosion printing.

From the standpoint of process viability, the factors which dictate our selection of materials and processes for generation of crosslinked base layers include:

(a) Solubility of starting materials so that these can be applied from solution in commonly employed solvents and the resulting coatings can be cured/crosslinked within minutes at temperatures not exceeding 120° C. when plastic substrates, such as, polyester, e.g., Mylar, are employed.

(b) The cured films must be tack-free so as to eliminate the possibility of blocking on storage in roll form.

(c) The polymer binders should be compatible with inorganic fillers such as silica to obtain stable dispersions and homogeneous coatings.

(d) Formulations containing binder-crosslinking agent-filler combinations should have the necessary pot life desired for a particular coating environment.

The invention relates to the use of solvent castable polymeric/oligomeric materials containing residual reactive sites such as free hydroxyl, epoxy, olefinic, acetylenic, α, β-unsaturated carbonyl moities, etc., which can be crosslinked by suitable reagents by using heat and/or radiation to accelerate the curing process. With these materials, crosslinking can also be accomplished by thermal or radiation-induced processes without the addition of another crosslinking agent.

Following are representative examples of various crosslinked polymer systems for application according to this invention:

(a) Urethane crosslinked cellulosic coatings with and without roughness-causing particulate material are formed from cellulose derivatives and aromatic or aliphatic polyisocyanates in the presence of suitable dispersing agents, catalysts and wetting agents well known to those skilled in the polyurethane art. Suitable cellulose derived materials are: Cellulose Acetate Butyrate (CAB), Ethyl Cellulose (EC), Nitrocellulose, Cellulose Acetate and Cellulose Diacetate, etc. Alternate materials containing unsubstituted hydroxyl groups for reaction with polyisocyanates to form crosslinked polyurethanes are: Polyvinylbutryal, Bakelite phenoxy resins, phenolic resins, epoxies such as Eponols and polyether glycols such as "Teracol" (from DuPont), and Poly(-Sytrylallyl alcohol). Typical polyisocyanates that react with available —OH groups of cellulosic binders or alternate systems include Toluene diisocyanate, Diphenylmethane diisocyanate, Hexamethylene diisocyanate-based systems such as Desmodur N-75 (aliphatic prepolymer Mobay Chemical Co.) and Mondur resins such as CB-60 and CB-75, and Mondur HC. Melamine crosslinking agents can also be employed to obtain thermoset coatings with the above binders. Inorganic fillers such as $SiO_2$, $CaCO_3$, $TiO_2$ and calcium silicate etc. of particle size ranging from 0.5 μm to 10 μm can be incorporated by the usual techniques of grinding or milling together with the binder, the urethane solvent such as MEK-Toluene mixture, and a suitable dispersing agent such as Multron R221-75, a saturated polyester resin obtainable from by Mobay Chemicals.

The urethane forming reactions of the above described binders and urethane prepolymers are catalyzed by organometallic reagents such as stannous oleate, stannous octoate, dibutyl-tin dioctoate, dibutyl-tin dilaurate, calcium or cobalt naphthenate and also tertiary amines. Further acceleration of the crosslinking reaction can be achieved by thermal treatment of the coatings.

(b) Crosslinked polymer coatings with beneficial properties can be obtained by the use of radiation curable acrylated polyurethane oligomers of the type "Uvithane 783" and "Uvithane 788" available from Thiokol Chemical Div. Inorganic fillers such as silica can be dispersed by the conventional techniques prior to coating.

Highly crosslinked films can also be obtained by thermal or radiation-induced copolymerization/co-crosslinking of the above UV curable urethane oligomers with added multifunctional monomers such as pentaerythritol triacrylate (PETA) and trimethylol-propane triacrylate (TMPTA) availabe from Celanese Corporation.

(c) Desired crosslinked films with or without inorganic fillers can also be formed by thermal, microwave, or UV curing of coatings cast from blends of acrylated cellulosic derivatives and UV curable urethane oligomers described in (b), above.

While a number of materials and approaches described above are suitable for hard polymer films desired to achieve superior quality electroerosion printing materials, we have found that excellent anti-abrasion properties and writing characteristics can be achieved by utilizing cellulose derived binders such as cellulose acetate butyrate or ethyl cellulose with polyisocyanates as crosslinking agents. The material may be used unfilled or filled with silica particles.

For optimal performance in terms of faster curing within 3–5 minutes at 100° C. or so to provide coatings free of the blocking problem, and exhibiting scratch resistance, debris-free printing, or non-adherent debris, and substantially no accumulation on the print head during writing, the base coat formulations were typically formed at a NCO:OH ratio of 0.7, a silicon particle PVC (pigment volume concentration) of 10, and a catalyst concentration (T-9) in the range of 0.5 to 1% based on resin solids.

Measurement of mechanical properties of silica loaded CAB-Urethane films at a PVC of 15 and T-9 concentration of 1% showed that 6–8 μm thick free standing films are quite brittle, having only an Instron elongation at break of from about 5 to 10%.

The films of this invention are tough, i.e., sufficiently impact and abrasion resistant as measured by Instron elongation to break testing so as to reduce plastic deformation of the support on which they are deposited thus minimizing scratching. The films are also characterized by a roughness sufficient to minimize scratching of the surface layers during electroerosion printing, but sufficiently rough to scour off from the stylus debris caused by writing. For example, Talysurf Traces of typical filled films show a peak to valley ratio on the order of 1 to 2 micron.

Although the above parameters are for the optimized coatings, there exists a latitude in the formulations without significantly affecting the functional characteristics of films. For example, the NCO:OH ratio can be varied from 0.5 to 1, coating thickness can be between 2–10 μm, the concentration of silica (or alernate filler) can be in the PVC range of 2–15 and the catalyst concentration (T-9) can be between 0.5–1.5 based on resin solids for maximum crosslinking during the allowable curing time and temperature.

EXAMPLE 1

In producing the products of the invention a composition of the following formulation was prepared for the cross-linked base layers:

| | Parts by weight |
|---|---|
| Cellulose Acetate Butyrate (CAB) | 30.5 |
| Silica (IMSIL A-108H) | 14.4 |
| Methyl Ethyl Ketone (MEK) | 156.1 |
| Toluene | 20.0 |
| Multron R221-75 | 1.0 |

CAB was first dissolved in the solvent mixture and combined with silica and the dispersing agent (R221-75). The resulting composition was ball milled to obtain a homogeneous dispersion which was combined and thoroughly mixed with the following ingredients to form a final coating mixture.

| | Parts by weight |
|---|---|
| Desmodur N-75 (isocyanate crosslinker) | 16.5 |
| Stannous Octoate (T-9 catalyst) | 0.05 |

-continued

| | Parts by weight |
|---|---|
| from M & T chemicals | |
| Fluorocarbon Surfactant (FC-430 by 3M) | 0.20 |

This composition was coated on a 2 mil thick polyester substrate (Mylar, E. I. du Pont de Nemours & Co.) and dried/cured at 100°-110° C. for 3-5 minutes to obtain 5-7 μm thick cross-linked polymer film.

On this coating there was deposited a 400-500 Å thick aluminum film by conventional techniques such as sputtering or vacuum evaporation. Finally, a lubricant film of graphite-binder dispersions such as Electro Dog from Acheson Colloid Co., as disclosed in copending application Ser. No. 454,744, filed Dec. 30, 1982 and assigned to the present assignee, was applied using conventional web coating apparatus followed by drying at 100° C. for 5 minutes or so. The viscosity of the lubricant coat formulation is adjusted by appropriate dilution such that the thickness of the dry overcoat is between 2000-4000 Å or 20-35 microgram/sq. cm.

The multilayer structure thus completed is illustrated in FIG. 1 of the drawing wherein 1 indicates the substrate, e.g., polyester.

Cross-linked polymer layer 2 is deposited on substrate 1, between the substrate 1 and conductive film 3, e.g., aluminum. lubricant layer 4 is then deposited on the surface of the aluminum layer.

For the support 1, any suitable material may be used such as various polymers, e.g., polyester, polyolefins, polycarbonates, polyamides, etc., paper or the like.

The lubricant layer 4 preferably comprises a polymer binder containing conductive lubricating particles, such as graphite. The polymer binder may be cross-linked material, such as ethyl cellulose urethane, which is soluble, permitting removal by solvents to expose the underlying aluminum/aluminum oxide surface so that the material may be used to produce an offset master as described below.

Figure 2:
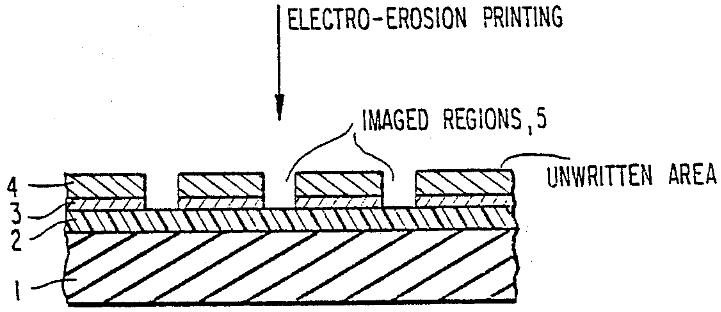
FIG. 2 is a cross-sectional view of a direct negative made in accordance with this invention.

When employed as a printing material using an electroerosion device at 30-60 volts the material of FIG. 1 may be imaged by clean erosion of aluminum which, as shown in FIG. 2 of the drawing, is accompanied by the removal of the overlayer in the written or imaged areas 5. This exposes the transparent substrate/base coat with consequent generation of a scratch-free direct negative.

Figure 3:
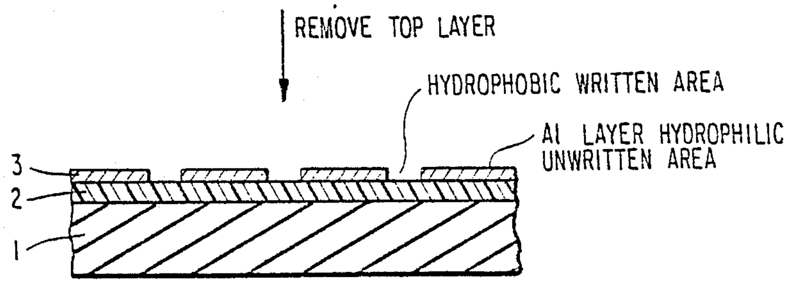
FIG. 3 is a cross-sectional view of an offset master made in accordance with this invention.

For application of the printed or imaged material of FIG. 2 as an offset master, it is necessary to obtain hydrophobic-hydrophilic mapping so that when an oleophilic ink is employed, the written area remains ink receptive while the unwritten area is non-receptive to oil based inks. Since the direct imaged region of the electro-erosion printing material of the present invention contains a hydrophobic cross-linked polymer layer, removal of the lubricant layer 4 from the unwritten areas, as is shown in FIG. 3 of the drawing, using isopropanol or other suitable solvents, exposes areas of the hydrophilic aluminum film 6 resulting in the formation of an offset master.

EXAMPLE 2

The following mixture was ball milled to obtain a Mill Base as a homogeneous dispersion prior to preparing final coating formulations A and B.

| | Parts by weight |
|---|---|
| Cellulose acetate butyrate (553.4) | 4.8 |
| Silica (IMSIL A-108H)* | 4.4 |
| Methyl ethyl ketone (MEK) | 25.0 |
| Toluene | 5.0 |
| Multron R221-75 | 0.3 |
| Coating Formulation A (PVC = 5) | |
| Mill base (prepared above) | 10.0 |
| CAB | 4.0 |
| MEK | 13.0 |
| Toluene | 3.0 |
| CB-75 (Mobay) | 6.2 |
| Stannous octoate (T-9) | 0.009 |
| FC-430 | 0.027 |

*Amorphous silica from Illinois Mineral Co., Illinois.

This was coated on a 2 mil Mylar substrate as described in Example 1 to obtain a 5 micron thick dry film. Subsequent coatings of the conductive film and lubricant layer provided electroerosion printing material which was used to generate scratch free direct negatives and offset masters as in Example 1.

| Coating Formulation B (PVC = 10) | |
|---|---|
| | Parts by weight |
| Mill base | 10.0 |
| CAB | 2.0 |
| MEK | 9.0 |
| Toluene | 2.0 |
| Desmodur N-75 | 2.5 |
| T-9 | 0.006 |
| FC-430 | 0.02 |

EXAMPLE 3

A Poly(Styryl Allyl Alcohol)-Silica Mill Base was prepared according to the following formulation:

| | Parts by weight |
|---|---|
| RJ 101 (Monsanto) | 20.0 |
| MEK | 16.0 |
| Toluene | 4.0 |
| IMSIL A 108-H | 22.0 |
| R 221-75 | 1.0 |

This mixture was ball milled for 18 hours and the mill base was employed for the following coating:

| | Parts by weight |
|---|---|
| Mill base | 6.0 |
| Desmodur N-75 | 2.3 |
| T-9 | 0.002 |
| FC-430 | 0.004 |

The cellulose acetate butyrate (CAB) used in the formulation is available from Eastman Chemicals.

The material has a hydroxy equivalent weight of 300-400. The preferred material should have two or more reactive hydroxy sites per chain. If less than two active sites exist per chain, the resulting polyurethane is thermoplastic rather than thermosetting since the required crosslinking fails to develop.

The preferred crosslinking agents are isocyanates available from Mobay Chemical as Desmondur N-75 and Mondur CB-60 or Mondur CB-75. The isocyanate compounds used in the binder have a molecular weight of 150-500 per NCO group. The isocyanate has at least three reactive sites, i.e., NCO groups, per chain so that crosslinking and thermosetting properties are established in the resulting polyurethane binder.

While the proportions of the CAB and isocyanate are not absolutely critical, they must be selected so that the proper thermosetting properties are obtained; theoretically, at an NCO/OH ratio of 1.0 the properties associated with molecular weight are optimized. In general, therefore, in using two-component polyurethane coatings of this invention, we prefer to operate in an NCO-/OH ratio in the range of 0.8 to 1.2.

The intermediate layer further comprises a filler of solid particles, such as silica, in a pigment volume concentration of at least about 5.

The $SiO_2$ pigment should have a particle size of from 1 to 3 microns and should be added to the binder in the range of from about 10 to 30% by weight. The silica particles act as a filler in the system to prevent blocking and also help to improve wear-resistance of the coating during writing.

The catalyst is used to promote reaction between the isocyanate and CAB resin to reduce the curing temperature and curing time. Minimum curing temperature and shortened cure time are important to limit any adverse effects on the substrate, such as distortion of a polymer substrate, e.g., Mylar.

Suitable catalysts for use in this invention include, but are not limited to tertiary amine type catalysts, such as 2,4,6-tris(dimethylaminomethyl) phenol, and organometallic compouds, such as stannous octoate, dibutyl tin dilaurate, or other organometallic compounds. Also, combinations of tertiary amines with organometallic compounds may be employed. Catalyst concentrations of about 0.1 to 1% by weight of the binder are satisfactory.

The dispersing agent serves to chelate the silica particles such that they are individually suspended within the uncured binder to permit uniform dispersion. The dispersing agent selected in the foregoing example not only is effective as a dispersant but also has the further benefit of reacting with the isocyanate to form a part of the crosslinked polyurethane binder following the curing stage of the process.

The surfactant provides wetting and levelling and flow control functions by reducing the surface tension of the composition to permit smooth defect-free coating.

Several types of volatile non-reactive solvents can be used in the production of the compositions of the invention to reduce the solids content and permit the coating of very thin layers on the substrate. Classes of suitable solvents include, but are not limited to, aromatic solvents such as toluene, xylene; ketones such as methylethyl ketone and isophorone; and acetates such as ethylacetate and butylacetate. The preferred solvents employed in the composition are about 80 parts by weight methylethyl ketone and 20 parts by weight toluene.

The coatings of the above formulations can then be applied to a suitable substrate, such as, polyester, e.g., Mylar, or paper at a thickness in the range of about 100 to 600 microinches using conventional web-coating procedures and equipment. The resulting coating is cured at below 100° C. for from 4–5 minutes.

Once the support has been coated as set forth above, a thin conductive film such as vaporized aluminum, having a resistivity ranging from approximately 0.5 ohms to 5 ohms per square, is deposited over the cured, hard layer.

The recording material is then ready for use in a variety of electroerosion printing processes as described above.

In a method embodiment, the present invention provides a method for producing an offset master (FIG. 3) comprising providing an electroerosion recording medium composed of a non-conductive support for an ink receptive material in an intermediate layer, a thin layer of conductive ink repellent material capable of being removed by evaporation during electroerosion recording, where the intermediate layer is a thin, hard, cross-linked polymer between the support and the layer of conductive material. The conducitve material is then subjected to elctroerosion recording to remove the conductive layer and to expose the underlying ink receptive material in desired imaged areas. This leaves the ink repellent conductive surface unaffected in non-imaged areas, so that the electroerosion recording medium can be used as an offset master after electroerosion recording. In this method, the electroerosion recording medium can also include a lubricant layer on the surface of the conductive material facing the electroerosion stylus during recording, the lubricant layer being removed from the imaged areas during recording and being removable from the non-imaged areas after recording to expose the ink repellent surface of the underlying conductive layer. This lubricant layer can be comprised of a soluble, cross-linked polymer binder containing graphite particles and the conductive layer can be aluminum.

While the invention has been described in connection with certain preferred embodiments which have been demonstrated to be particularly effective, other adaptations and embodiments of the invention may be made by those of skill in the art without departing from the spirit of the invention or the scope of the following claims.

Having thus described our invention, what we claim as new, and desire to secure by Letters Patent is:

1. An electroerosion recording medium, comprising:
an electrically non-conductive support,
a layer of erodible material sufficiently thin to be eroded when subjected to current pulses from recording styli during said electroerosion recording, and
an intermediate layer located between said support and said layer of erodible material, said intermediate layer having a thickness of at least about 25K angstroms and being comprised of a cross-linked polymer having a cross-linking agent therein, said polymer being selected from the group consisting of cellulosic derivatives, vinyl compounds, and epoxies, said intermediate layer also including hard particulates in a pigment to volume concentration of about 2–15 wherein said intermediate layer is sufficiently hard to hold said particulates substantially in place during said electroerosion recording.

2. The recording medium of claim 1, where said hard particulates are silica.

3. The recording medium of claim 1, further including a lubricating overlayer located on the styli contacting side of said layer of erodible material.

4. The recording medium of claim 1, wherein said intermediate layer is curable at temperatures less than about 120° C. in times not in excess of about 5 minutes.

5. The recording medium of claim 4, where said intermediate layer is sufficiently rough to scour off from said styli debris caused by said electroerosion recording.

6. The recording medium of claim 1, wherein said layer of erodible material is A1.

7. The recording medium of claim 1, wherein said cross-linked polymer is cellulose-acetate-butyrate cross-linked with isocyanate.

8. The recording medium of claim 1, where said intermediate layer is hydrophobic.

9. An electroerosion recording medium, comprising:
a support layer,
a thin layer of a conductive material which can be eroded by current pulses from recording styli during electroerosion recording,
an intermediate layer located between said support layer and said thin layer of conductive material and having a thickness of at least about 25K angstroms, said intermediate layer being comprised of a thermosetting cross-linked solvent castable polymeric-/oligomeric material containing residual reactive sites, and having dispersed therein solid particulates in a pigment to volume concentration of about 2-15, said intermediate layer bonding strongly to said support layer to substantially prevent plastic deformation during said electroerosion recording.

10. The recording medium of claim 9, where said intermediate layer is curable to produce said cross-linking at temperatures less than about 120° C. in times less than about 5 minutes.

* * * * *